(12) United States Patent
Abdelgadir et al.

(10) Patent No.: US 11,329,692 B2
(45) Date of Patent: May 10, 2022

(54) SIGNAL SENSOR

(71) Applicant: HITRON TECHNOLOGIES AMERICAS, INC., Centennial, CO (US)

(72) Inventors: Samih Abdelgadir, Toronto (CA); Gregory Fisher, Denver, CO (US); Charles Benny, Montreal (CA)

(*) Notice: Subject to any disclaimer, the term of this patent is extended or adjusted under 35 U.S.C. 154(b) by 0 days.

(21) Appl. No.: 17/322,898

(22) Filed: May 18, 2021

(65) Prior Publication Data

US 2021/0367641 A1    Nov. 25, 2021

Related U.S. Application Data

(60) Provisional application No. 63/029,692, filed on May 25, 2020.

(51) Int. Cl.
*H04B 3/46* (2015.01)

(52) U.S. Cl.
CPC ..................................... *H04B 3/46* (2013.01)

(58) Field of Classification Search
CPC .... G01R 31/58; H01B 11/18; H01R 13/6683; H04B 3/46; H04B 3/48
See application file for complete search history.

(56) References Cited

U.S. PATENT DOCUMENTS

| | | | | |
|---|---|---|---|---|
| 2013/0004179 A1* | 1/2013 | Nielsen | ................... | H04B 3/02 398/115 |
| 2013/0184890 A1* | 7/2013 | Li | ........................... | H02J 3/14 700/293 |
| 2014/0150047 A1* | 5/2014 | Rakib | ................ | H04N 21/4782 725/129 |
| 2015/0341810 A1* | 11/2015 | Murphy | .................. | H04B 3/46 375/224 |
| 2021/0289573 A1* | 9/2021 | Greene | ................ | H04B 17/391 |

\* cited by examiner

*Primary Examiner* — Khanh C Tran
(74) *Attorney, Agent, or Firm* — OPES IP Consulting Co. Ltd

(57) ABSTRACT

The invention provides a signal sensor. The signal sensor comprises a housing, having a connector and a display unit; a tuner, configured to receive a cable signal; a microcontroller unit (MCU), electrically connected with the tuner and the display unit; a scanning switch, electrically connected with the MCU; a power supply, configured to supply a power to the MCU, the tuner and the white LED; and a power switch, electrically connected with the MCU.

9 Claims, 2 Drawing Sheets

SIGNAL SENSOR

CROSS REFERENCE TO RELATED APPLICATION

The present application claims priority to U.S. Provisional Application Ser. No. 63/029,692, filed on May 25, 2020, which are hereby incorporated by reference in their entirety.

FIELD

This invention relates to a signal sensor, and more particularly, to a DOCSIS (data over cable service interface specification) signal sensor (DSS) that is capable of detecting whether there is signal at a RF (radio frequency) outlet.

BACKGROUND

Conventional approaches to test if there is signal at a RF outlet is either by plugging in a cable modem to see if it comes online, or by using a technician meter, which is usually expensive. Subscribers usually do not have a technician meter that they could use to validate if there is signal at an RF coax (coaxial cable) port. The only option left for subscribers is to connect their cable modem and wait to see if it would come online.

Some subscribers may attempt another outlet, but most would call into the call center to book a professional installation (a "truck roll"). Such traditional measurements decreases the OPEX (operating expense) savings that the operator tries to realize through the subscriber's installation of the modem himself/herself.

It's expensive for the operator to send a technician to the subscriber premise. Further, every time a subscriber calls the help desk, time and money are incurred, which ultimately causes a bad initial experience that may correlate to shortened customer retention.

SUMMARY OF THE DISCLOSURE

One of the purposes of the present invention is to provide a signal sensor, for users to easily detect whether there is cable signal at a coaxial outlet. The signal sensor includes a housing, having a connector and a display unit; a tuner, configured to receive a cable signal; a microcontroller unit (MCU), electrically connected with the tuner and the display unit; a scanning switch, electrically connected with the MCU, a power supply, configured to supply a power to the MCU and a power switch, electrically connected with the MCU.

DETAILED DESCRIPTION

Unless defined otherwise, all technical and scientific terms used herein have the same meanings as commonly understood by one of skill in the art to which this disclosure belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
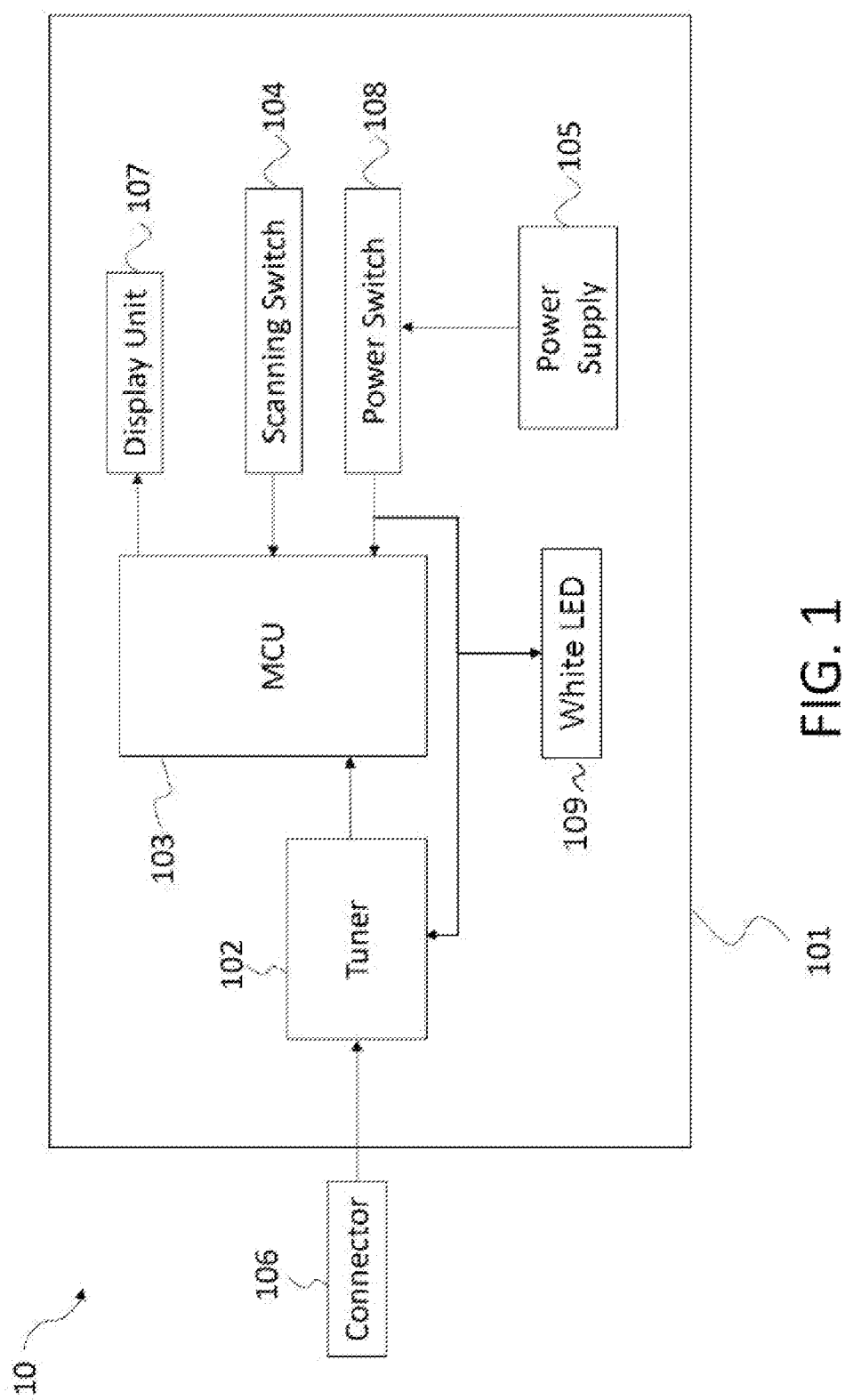
FIG. 1 illustrates the functional blocks of the signal sensor according to the present invention.

Reference is made to FIG. 1, which illustrates the functional blocks of the signal sensor according to the present invention. The signal sensor 10 includes a housing 101, a tuner 102, a microcontroller unit (MCU) 103, a scanning switch 104 and a power supply 105. In the present embodiment as illustrated in FIG. 1, the signal sensor 10 is a DOCSIS (data over cable service interface specification) signal sensor (DSS).

The housing 101 has a connector 106 and a display unit 107. The tuner 102 is configured to search (or to scan, to detect) for cable signals, and the MCU 103 electrically connects with the tuner 102 and the display unit 107. Further, the scanning switch 104 electrically connects with the MCU 103. The power supply 105 is configured to supply a power to the MCU 103, the tuner 102 and the white LED 109 when the power switch 108 is slid on.

When the signal sensor 10 is used, the user firstly turns the signal sensor's 10 power on, which is by sliding the power switch 108 to ON position according to the present embodiment of the present invention. The implementation for the power switch 108 may be adjusted by people with ordinary skill in the art, to fit for different practical demands. Thus, the implementation of the power switch 108 should not limit the scope of the present invention.

The display unit 107 in the present embodiment is implemented as an LED light, which will show white when signal sensor 10 is powered on and may show two colors of light, including green and red to indicate the status of the signal sensor 10. After the signal sensor 10 is turned on, the LED light will be constant white and flashing red to indicate boot up and then it will be constant white, indicating it is ready to scan signals.

The user then places the signal sensor 10 into a coaxial socket (not shown in the figure), by inserting the connector 106 into the coaxial socket. In the present embodiment, the connection 106 is implemented as an F-type male connector. Preferably, the F-type male connector is a 75 Ohm F-type male connector. However, such specific type of connector should not be limiting the scope of the present invention. It can be understood that the connector may be modified by people with ordinary skill in the art to fit with different practical demands.

Since the connector 106 is implemented as an F-type male connector, it can be directly inserted into a RF outlet (or coaxial wall socket). Such F-type male connector 106 may save more time comparing to traditional screw type connector, and makes the insertion more readily.

The user then presses the scanning switch 104. After pressing the scanning switch 104, the display unit 107 starts to flash green light. It is worth to note that, if the scanning switch 104 is not pressed within a predetermined time period after the signal sensor 10 is powered on, the signal sensor 10 will return to sleep mode to save power. The predetermined period may be adjusted accordingly. In the present embodiment, the predetermined period is ten seconds.

Assuming that the scanning switch 104 is pressed within ten seconds after the power switch 108 is slid on, the MCU 103 will receive a signal indicating the scanning switch 104 status, the MCU 103 will then controls the tuner 102 to start scanning (or detecting, searching) cable signal. Before any scanning result is determined by the MCU 103, the display unit 107 remain flashing green light. It can also be understood that if the display unit 107 is flashing green light, the signal sensor 10 is under scanning operation.

The tuner 102 will pass all the scanning result to the MCU 103, for the MCU 103 to determine whether the signal collected belongs to coaxial cable signal. The MCU 103, based on signal intensity, to determine whether the signal collected belongs to coaxial cable signal. To be more specific, if the MCU 103 detects that the signal intensity for the detected signal falls within −15 dBmV to +15 dBmV, then the MCU 103 determines that the signal belongs to coaxial cable signal. In such scenario, the MCU 103 controls the display unit 107 to display constant green light. Otherwise, the MCU 103 controls the display unit 107 to display red light. Result of the scan will be displayed for 10 seconds.

The user can, by the light flashed or displayed by the display unit 107, easily interpret either what operation mode the signal sensor 10 is currently under, and whether if there's coaxial cable signal at the outlet.

Figure 2:
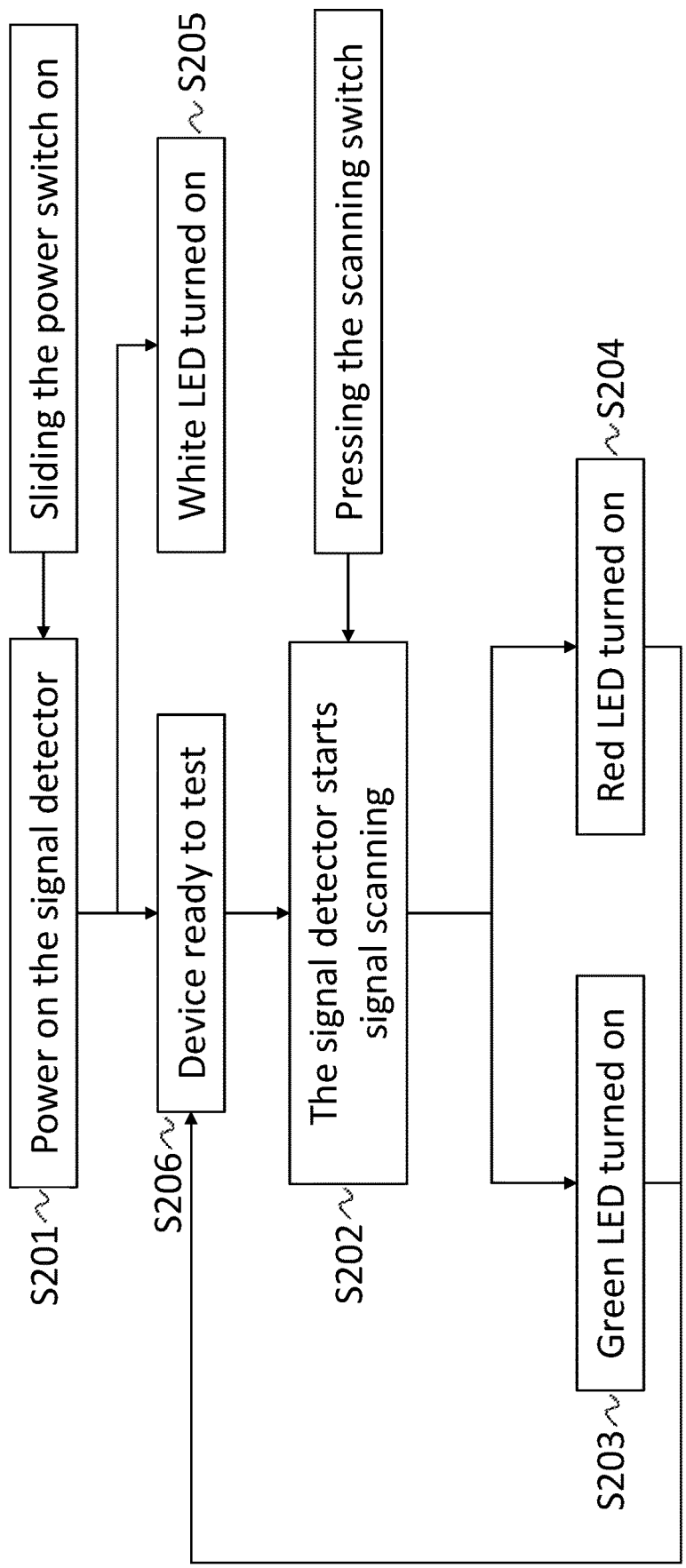
FIG. 2 illustrates the working flowchart of the signal sensor according to the present invention.

Reference is collectively made to FIG. 2, which illustrates the working flowchart of the signal sensor according to the present invention. Referring to FIG. 2, in step S201, power on the signal sensor 10. It can also be understood that, a user, when using the signal sensor 10, firstly slide the power switch 108 to on position to power on the signal sensor 10.

After the signal sensor 10 is powered on, the MCU 103 controls the display unit 107 in step S206, which is embodied as an LED light in the present embodiment, to display white light (as shown in step S205). Within a predetermined time period, the scanning switch 104 must be pressed, or the signal sensor 10 will turn to sleep mode and the display unit 107 will be turned off (by MCU 103). The predetermined period may be adjusted accordingly. In the present embodiment, the predetermined period is ten seconds.

Before pressing the scanning switch 104, the user places the signal sensor 10 into a coaxial socket, by inserting the connector 106 into a coaxial socket. In the present embodiment, the connection 106 is implemented as an F-type male connector. Preferably, the F-type male connector is a 75 Ohm F-type male connector. However, such specific type of connector should be limit the scope of the present invention. It can be understood that the connector may be modified by people with ordinary skill in the art to fit with different practical demands.

Next, in step S202, the signal sensor 10 starts scanning signal after the scanning switch 104 is pressed. The scanning switch 104 is connected with the MCU 103, therefore, after the MCU 103 detects that the scanning switch 104 is pressed, the MCU 103 controls the tuner 102 to start scanning signals, and controls the display unit 107 to flash green light. It is worth to note that the flashing green light indicates that the tuner 102 is scanning (or searching, or detecting) for signals.

After the tuner 102 starts to scan cable signals, the tuner 102 will pass all the signals scanned to the MCU 103 for further processing. The MCU 103 then determines if cable signal exists according the signal intensity. If the MCU 103 detects cable signal, the MCU 103 controls the display unit 107 (i.e., the LED light) to turn displaying constant green light from flashing green light, as shown in step S203. However, if the MCU 103 determines no valid signals are detected (e.g., signal intensity blow certain threshold), the MCU 103 controls the display unit 107 to display constant red light, as shown in step S204. It is worth to note that, after the result is displayed for 10 seconds, the display unit will return to constant white indicating that signal sensor 10 is ready for a new scan and is on step S206.

The power supply 105 may implemented as a dry battery socket or a USB port. It is worth to note that people with ordinary skill in the art may adopt other kinds of implementation for the power supply 105 based on various practical demands. However, in the present embodiment, the power supply 105 is implemented as a dry battery socket, and is able to provide direct current with 3.3 V for the MCU 103 and the tuner 102.

The MCU 103 and the tuner 102 are two respective integrated circuit (ICs). The two ICs may be installed on a printed circuit board (PCB). The MCU 103 is in charge of software operation. It can also be interpreted that the MCU 103 wakes the tuner 102 up for single scanning after the scanning switch 104 is pressed. The MCU 103 communicates with the tuner 102 through I2C, which is a standard communication interface. However, the communication between the MCU 103 and the tuner 102 is not limited to I2C only. Other communication protocols may also be used in the present invention.

When the tuner 102 is awaken, the MCU 103 further controls the display unit 107 to flash green light, as described above. If the MCU 103 determines that there's cable signal detected, the flashing green light will be turned to constant green light. However, if the MCU 103 determines that there's no signal detected, the MCU 103 controls the display unit 107 to display red light.

Further, for the signal sensor 10 of the present invention, if the power switch 108 is on position ON, but the scanning switch 104 is not pressed within the next ten seconds, the signal sensor 10 will then turn to sleep mode. Such design may save more power for the signal sensor 10. The ten seconds waiting duration may be adjusted by people with ordinary skill in the art according to different practical demands. The waiting duration may be, for example, five seconds, eight seconds and etc. Note that pressing the scanning button 104 when in sleep mode will simply awake the MCU 103 and the tuner 102 and start the scan.

The tuner 102 is designed to detect signals within a specific frequency range. In the present embodiment, the frequency range is between 88 MHz to 1 GHz. Further and scanning bandwidth is designed to be 6 MHz. That is to say, if the first scanning is performed for the first frequency block 88 MHz/94 MHz, the next scanning will be 94 MHz/100 MHz, and the next will be 100 MHz/106 MHz, and so on with the last frequency block being 994 MHz/1000 MHz. The scanning frequency bandwidth may also be adjusted by people with ordinary skill in the art to fit different practical demands. Therefore, the 6 MHz as described here should not be limiting the scope of the present invention. Since the 6 MHz scanning frequency bandwidth is applied in the present invention, the number of analyzed cable channels is 152 ((1000−88)/6).

Further, according to definition, the signal intensity for cable signal is defined between −15 dBmV to +15 dBmV. Therefore, if the signal detected by the MCU 103 falls within the −15 dBmV to +15 dBmV range, the MCU 103 will then controls the display unit 107 to display green light as per step S203.

Further, a detection duration may be set to be five seconds. To be more specific, after the scanning switch 104 is pressed and the tuner 102 starts to scanning for cable signal for five seconds. If, within five second, a cable signal is detected, the MCU 103 controls the display unit 107 to display green light. However, if no cable signals are detected within five seconds, the MCU 103 controls the display unit 107 to display red light. The detection duration may be adjusted accordingly by people with ordinary skill in the art, to fit for different practical demands. Thus, the five second detection duration of the present embodiment should not limit the scope of the present invention.

A summary for LEDs behavior may be given accordingly. That is, if the display unit 107 displays white light, it means that the signal sensor 10 is turned on and ready to scan (as shown in Step S206). Note that the white LED will always stay on until the power switch 108 is slid OFF so it will always show when the other colors will lit. If the display unit 107 is flashing red, which means it is in boot up state. If the display unit 107 flashes green light, it means that the signal sensor 10 is scanning for cable signal. If the display unit 107 displays constant green light, it means that cable signal is detected. If the display unit 107 displays red light, it means that no cable signals are detected.

In sum, the present invention provides a DOCSIS (data over cable service interface specification) signal sensor (DSS) that is used to identify if there is a signal at an RF coax outlet. The main use cases of the DSS according to the present invention is to facilitate a cable modem's installation by the subscriber (a self-install). Since subscribers do not have a technical meter that they could use to validate if there is a signal at the RF coax port, the DSS as provided by the present invention may fill that role. Further, the DSS as provided in the present invention is competitive with respect to the cost, that the DSS is only 10% of the cost of a cable modem. By using the DSS of the present invention, a subscriber can test if there is a signal at the outlet prior to the self-install, thus achieving cost savings targeted by the operator. Having a DSS also eliminates the need to call into a call center and may achieve a higher first customer satisfaction and retention.

In sum, The DSS as provided in the present invention is reliable in that it solves the problem of a successful self-install in comparison to the other available options, though it is admittedly less efficient than products that cost hundreds of dollars.

In sum, the connector on the DSS can be manufactured in the form of a male or female connector. If it is manufactured in a male or female connector, the package can also include another connector to satisfy all installation use cases. Battery may be installed in the DSS of the present invention. In such scenario, end user will have a pull tab to have the device ready to use. The second use case is that the battery and device will be shipped separately and the end-user would have to install the battery himself before using the device.

Further, use-cases and potential applications and/or markets for the present invention are described below. One is to include the RF signal presence testers (DSS) with cable modems or gateways as part of the subscriber's self-install package. One another use-case may be used by home builders to check the coax connection in a new building. They may check if the fittings are good, wiring is properly terminated, and that the customer does not have ingress or egress noise as part of the home inspection.

One another use-case may be used by technicians to validate RF signal after a new coaxial cable installation. It takes much less time (5-10 seconds) to use the DSS to validate if there is RF signal on the wire, versus using a meter. This is a use-case where technicians can easily validate if their wiring installation is working.

Bluetooth for app-based reporting may be implemented on the DSS to gather telemetry essentially allows the creation of a cost-effective long-term test device that lives on the customer premise. Further, adding a low-power timer to the DSS allows the signal presence tester to wake and send data to a smart device (phone or tablet) or the cable WiFi gateway if it supports Bluetooth.

The DSS can also be installed at the outside tap (at the pedestal outside the house) and left at the customer premise over a period of time to isolate signal related issues. Signals fluctuate with time so it is necessary to gather data over a certain period, but the technician, of course, cannot leave their expensive meters at the customer premise. The tap is not where a modem is installed, but if the operator needs to test at the tap to isolate fault, this allows the operator to compare the signal at the tap outside the customer premise with what the modem itself reports to isolate possible issues like an ingress problem, noise that is being experienced upstream of the tap versus downstream towards the home, and etc.

The DSS can also connect to a mobile app using Bluetooth on the smart device. This is done such that subscribers can be notified the presence of a signal at the RF outlet via a user-friendly interface. For example, if a customer is self-installing a video set-top box at another RF port in the house, they can easily plug in the DSS and it would report to the app whether the outlet can be used. This eliminates the time, effort, and potentially bad experience associated with plugging in the video set-top box, waiting, and then eventually finding out 15 minutes later that it is not coming online.

Adding Bluetooth also allows the operator to verify self-install candidates before mailing the customer the self-install kit/gateway. A scenario is seen where a subscriber downloads a mobile app and selects that they are a new subscriber. The app then identifies to the customer the nearest operator store where they could pick up the DSS—the app also provides an option for mailing out the DSS. The subscriber then plugs in the DSS, DOCSIS telemetry is collected and sent to the mobile app via Bluetooth, the data is then sent to the cloud for the operator to measure the health of the connection before the customer is deemed a self-install candidate. The customer is also notified through our mobile app if they need a technician for repairs, or they would like to pick up the self-install kit that includes the modem/gateway.

Adding a USB port to introduce powering over the USB port. This allows the technician to install the signal presence tester at multiple outlets in the home, let it run some tests, walk back into the home and plug in their laptop to download the data instead of having to be physically present in the home with the meter while running tests. This is an application when customers or technicians are concerned about social distancing and are looking to reduce the amount of time a technician is present in the home (health/safety savings).

The DSS also allows technicians to reduce their installation time as port testing can be done in parallel versus individually performed with the meter one at a time. Technicians will use the DSS to validate the signal at the various RF jacks in the home in parallel to other work that is required, like installing TV service (set-top box) or home phone. A professional installation no longer needs to be executed serially where the technician must spend time with their meter at each RF outlet to validate the presence and health of a signal one after the other. The technician can now simply check the signal health at the input into the home using their meter, plugs in the DSS at the various outlets, continues with the other parts of the installation, comes back and reads the data from the DSS by connecting their computer via USB to read the data at the RF ports. The same scenario can be achieved via Bluetooth but instead of the technician going back to the DSS to read the data, the information is sent back to the mobile app or meters to validate the health of the signals.

Adding a USB port, akin to using Bluetooth, also allows the operator to verify self-install candidates before mailing the customer the self-install kit/gateway. We see a scenario where a customer downloads our mobile app, and they select that they are a new subscriber. Adding a USB port, akin to using Bluetooth, also allows the operator to verify self-install candidates before mailing the customer the self-install kit/gateway. We see a scenario where a customer downloads our mobile app, and they select that they are a new subscriber. The app then identifies to the customer the nearest store where they can pick up the DSS—the app also provides an option for mailing out the DSS. The customer then plugs in the DSS, DOCSIS telemetry is collected and stored locally on the device. The customer would then drop off the DSS to the operator's store or mail out the DSS where the operator would plug in the signal presence tester via USB to load the data to measure the health of the connection before the customer is deemed a self-install candidate.

The value of adding the USB (or Bluetooth) to the DSS is that it provides more telemetry about the signal at the port—like power levels, SNR, etc. . . Without a mechanism to extract the data in real-time, the DSS is simply a tool to validate if there is, in fact, a valid signal. A green light is used to indicate if a signal is marginal, and if a technician is present onsite it would be great to know that information to rectify the issue right away, so it does not get worse with time.

In sum, a subscriber does not need the detailed telemetry gathered via USB or Bluetooth for self-install. If it can be identified that there is a signal and guide the subscriber to install the gateway/modem, the health of the signal can be learned from the modem's reading and advise the operator to proactively schedule a technician to go onsite, or simply guide the customer to schedule a technician through our mobile app.

The invention claimed is:

1. A signal sensor, comprising:
    a housing, which includes a connector and a display unit mounted thereon;
    a tuner, arranged in the housing and configured to receive a signal;
    a microcontroller unit (MCU), arranged in the housing and electrically connected with the tuner and the display unit;
    a scanning switch, arranged in the housing and electrically connected with the MCU;
    a power supply, configured to supply a power to the MCU, the tuner and a white LED; and
    a power switch, electrically connected with the MCU;
    wherein the signal sensor determines whether the signal belongs to a coaxial cable signal according to signal intensity of the signal.

2. The signal sensor of claim 1, wherein the power supply is implemented as a dry battery socket or a USB port.

3. The signal sensor of claim 1, wherein the display unit is an LED light.

4. The signal sensor of claim 1, wherein the connector is an F-type male connector.

5. The signal sensor of claim 4, wherein the F-type male connector is a 75 Ohm F-type male connector.

6. The signal sensor of claim 1, wherein the tuner scans the signal within a frequency range.

7. The signal sensor of claim 6, wherein the frequency range is from 88 MHz to 1 GHz.

8. The signal sensor of claim 6, wherein the tuner scans the signal based on a scanning bandwidth.

9. The signal sensor of claim 6, wherein the scanning bandwidth is 6 MHz.

* * * * *